United States Patent [19]
Wilfert et al.

[11] 3,877,741
[45] Apr. 15, 1975

[54] BUMPER FOR MOTOR VEHICLES, ESPECIALLY PASSENGER MOTOR VEHICLES

[75] Inventors: Karl Wilfert, Gerlingen-Waldstadt; Rudolf Andres, Sindelfingen, both of Germany

[73] Assignee: Daimler-Benz Aktiengesellschaft, Stuttgart, Germany

[22] Filed: Oct. 6, 1972

[21] Appl. No.: 295,487

[30] Foreign Application Priority Data
Oct. 9, 1971 Germany............................ 2150444

[52] U.S. Cl................................... 293/89; 293/88
[51] Int. Cl............................................. B60r 19/06
[58] Field of Search............. 293/73, 74, 75, 76, 77, 293/78, 79, 84, 88, 89, 96

[56] References Cited
UNITED STATES PATENTS
1,799,894  4/1931  Fritsch................................. 293/89
1,811,569  6/1931  Thomas............................... 293/84
1,855,977  4/1932  Llobet................................. 293/89
1,901,227  3/1933  Cossalter........................... 293/84
1,954,776  4/1934  Haynes............................... 293/89
2,026,113  12/1935 Williams.............................. 293/89
2,984,512  5/1961  Shaginaw............................ 293/73

Primary Examiner—Lloyd L. King
Assistant Examiner—Robert Saifer
Attorney, Agent, or Firm—Craig & Antonelli

[57] ABSTRACT

A bumper for motor vehicles, especially passenger vehicles which is automatically displaceable in the vehicle longitudinal direction under impact action; the bumper consists of a center portion of high rigidity which is supported under interposition of conventional shock-damping or shock-absorbing means at form rigid body parts such as vehicle longitudinal bearers while two laterally extending portions adjoining the center portion and guided by the latter are pivotally mounted at a fixed vehicle part.

31 Claims, 4 Drawing Figures

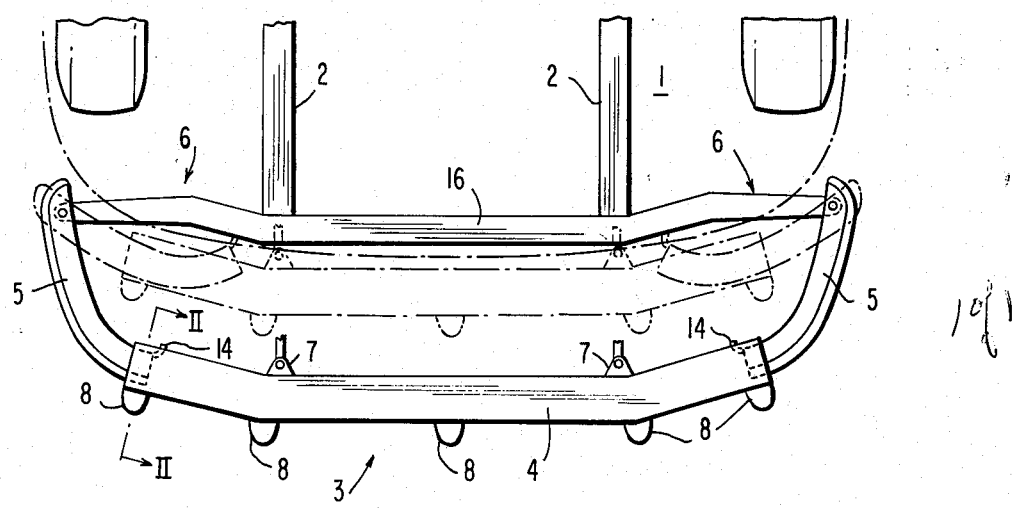
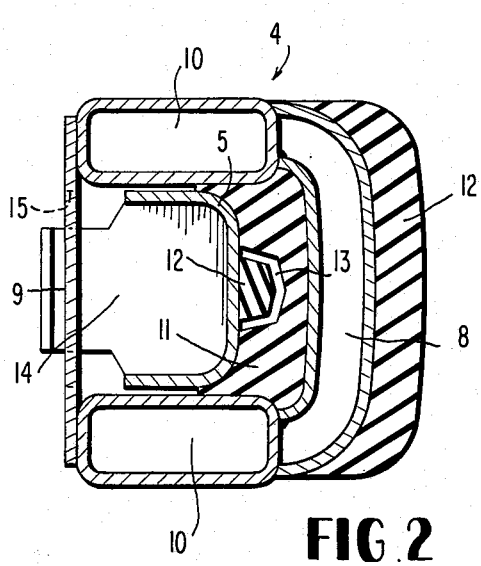
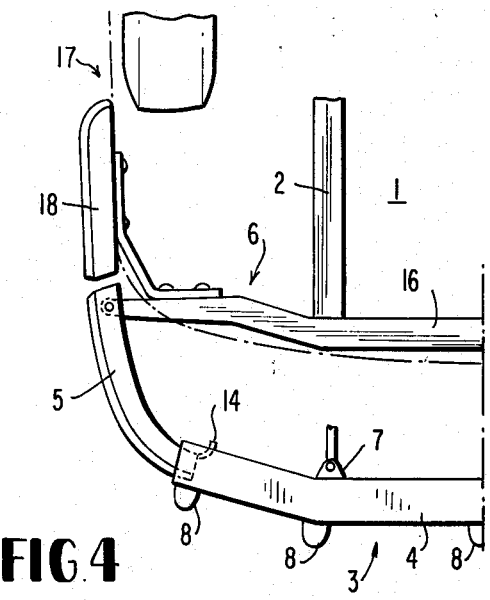
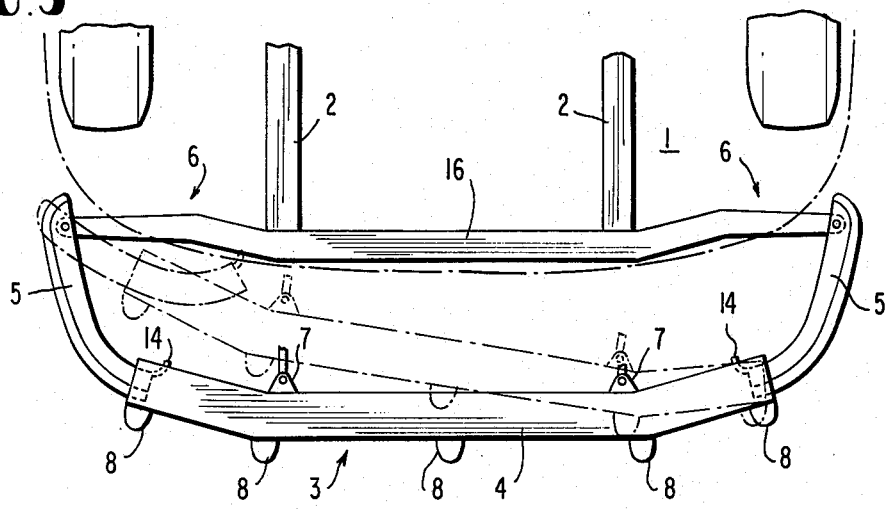

BUMPER FOR MOTOR VEHICLES, ESPECIALLY PASSENGER MOTOR VEHICLES

The present invention relates to a bumper for motor vehicles, especially for passenger motor vehicles, which is automatically displaceable in the vehicle longitudinal direction under impact action.

For purposes of avoiding damages at the body of passenger motor vehicles in case of minor impact accidents, it has already been proposed heretofore on several occasions to connect the bumpers with fixed vehicle parts by means of shock absorbers, springs or deformable intermediate members. However, such bumpers are very heavy and project very far from the vehicle both forwardly as also toward the side in order that the steerability of the wheels is not impaired following an impact in the vehicle longitudinal direction as also an impact obliquely thereto.

It is the aim of the present invention to provide a bumper which fully satisfies all requirements but which does not entail the aforementioned shortcomings and in which, in particular, the lateral distance to the body is kept as small as possible so that the end of, for example, the rear bumper is prevented during an accident from hooking onto an obstruction such as a pole or guard rail support.

Consequently, a bumper for motor vehicles, especially for passenger motor vehicles is proposed which is automatically displaceable in the vehicle longitudinal direction under impact action, in which, according to the present invention, the bumper, consists of a center portion or section of high rigidity that is supported under interconnection of conventional shock-damping or shock-absorbing means at fixedly constructed body parts, for example, at vehicle longitudinal bearers whereby additionally two laterally extending means adjoining the center portion and guided by the latter are pivotally supported at a fixed vehicle part.

In order that damages of the center portion can be prevented and a favorable force introduction takes place, the center portion is constructed rectilinearly at least between the support places and then extends on both sides at an inclination or under continuous curvature in the direction of the horns.

According to a further feature of the present invention, the center portion has an approximately box-shaped construction which is created by means of two box-like bearers arranged vertically one above the other and connected with each other by bumper horns and a rear closure plate.

It is of advantage if the intermediate space between the two box-shaped bearers is filled by an insert consisting of elastic material and projecting forwardly beyond the box-shaped bearers.

Damages of other vehicles, for example, during parking can be avoided if both the bumper horns as also the laterally extending means are provided with an abutment means of an elastic material.

An impairment of the steerability of the wheels and a damaging thereof is avoided if the laterally extending means, in case the center portion gives way, are guided by the back side of the elastic insert and are able to emerge out of the center portion through an aperture in the rear closure plate.

During this operation which may also involve only one laterally extending means depending on the impact angle, it is of advantage if the horns are provided with angularly bent ends which abut during normal driving operation at an edge of the aperture. In that case, no horn can ever become disengaged from the center portion.

In an advantageous embodiment of the present invention, the fixed vehicle part at which the laterally extending means are pivotally supported is constituted by a girder or traverse extending approximately in the vehicle transverse direction and supported at the vehicle longitudinal bearers.

It may be of advantage in vehicles with large forward and/or rear overhang if terminal members extending approximately to the cutouts or openings of the wheel boxes and constructed preferably similar to the horns, are mounted adjoining the pivotal horns.

Accordingly, it is an object of the present invention to provide a bumper for motor vehicles, especially for passenger motor vehicles, which avoids by simple means, the aforementioned shortcomings and drawbacks encountered in the prior art.

Another object of the present invention resides in a bumper for motor vehicles which is relatively light in weight yet offers great safety against impairing the steerability of the wheels or damage to the tires.

A further object of the present invention resides in a bumper for motor vehicles which permits a minimal distance thereof from the body, paarticularly along the sides of the body.

A still further object of the present invention resides in a bumper of multi-partite construction which far-reachingly protects the center portion against damages yet permits a favorable introduction of forces acting on the bumper into the fixed vehicle parts.

Another object of the present invention resides in a bumper for motor vehicles which not only protects the vehicle itself against damage but also protects other vehicles against damage, for example, when parking.

These and further objects, features, and advantages of the present invention will become more apparent from the following description when taken in connection with the accompanying drawing which shows, for purposes of illustration only, two embodiments in accordance with the present invention, and wherein:

FIG. 1 is a somewhat schematic top plan view of a bumper arrangement in accordance with the present invention in both extreme positions at the front section of a motor vehicle;

FIG. 2 is a cross-sectional view, on an enlarged scale, taken along line II—II of FIG. 1;

FIG. 3 is a schematic plan view, similar to FIG. 1, with an inclined impact action on the bumper in accordance with the present invention; and FIG. 4 is a schematic plan view of one-half of a modified embodiment of a bumper in accordance with the present invention provided with terminal members adjoining the lateral horns.

Referring now to the drawing wherein like reference numerals are used throughout the various views to designate like parts, and more particularly to FIG. 1, a front section indicated only in dash line of a vehicle body 1 equipped with two vehicle longitudinal bearers 2 is provided with a bumper generally designated by reference numeral 3 which consists of a center portion 4 of high rigidity and laterally extending means 5 adjoining on both sides the center portion 4 and guided in the center portion 4; the lateral portions 5 are pivotally supported at a fixed vehicle part generally designated by reference numeral 6. The center portion 4 is connected with the vehicle longitudinal bearers 2 in a manner not illustrated in detail by means of conventional shock-damping or shock-absorbing means and is constructed rectilinearly between the support places 7 for avoiding damages in case of an impact. At both ends of the center portion 4, the latter extends obliquely in the direction toward the lateral portions 5.

As can be seen from FIG. 2, the center portion 4 possesses an approximately box-shaped construction. Two box-shaped bearers 10 connected with each other by bumper horns 8 and a rear closure plate 9, which are arranged vertically one above the other, produce a form-stable structural part. The intermediate space between the two box-shaped bearers 10 is filled with an insert 11 connected with the bearers 10; the insert 11 consists of an elastic material of any conventional type and projects forwardly beyond the box-shaped bearers 10. The lateral portion 5 abuts at the inner side of the insert 11 and includes an elastic support or abutment 12 which is guided in a groove 13 of the insert 11. An angularly bent end 14 at each lateral portion 5 which abuts at an edge of an aperture 15 in the rear closure plate 9 during the normal driving operation, prevents the lateral portions 5 from sliding out of the center section 4.

In FIGS. 1 and 3 is illustrated in dash line how the bumper 3 reacts in case of an impact directed in the vehicle longitudinal direction (FIG. 1) and in case of an inclined impact (FIG. 3). During this operation, the lateral portions 5 or only the lateral portion 5 near the impact slide in the direction toward the center portion 4 and penetrate through the aperture 15.

The fixed vehicle part 6 at which are supported the lateral portions 5 is constituted by a girder or traverse 16 extending approximately in the vehicle transverse direction. The girder 16 could also be constructed considerably more stable and sturdy and could serve for the absorption of forces which will occur when an energy absorption takes place by deformation work when the lateral portions 5 enter the center portion 4. In this case, the shock-damping or shock-absorbing members between the center portion 4 and the vehicle longitudinal bearers 2 could be constructed correspondingly smaller.

In the embodiment according to FIG. 4, one rigid terminal member 18 each is mounted adjoining the pivotal lateral portions 5 for the better flank protection of the area up to the cut-outs of the wheel casings 17; the appearance of a respective terminal member 18 is matched to that of the lateral portions 5. Such an arrangement is of advantage in particular for vehicles with large forward and/or rear overhang.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A bumper for motor vehicles, especially for passenger motor vehicles having form-rigid vehicle parts and a fixed vehicle part, the bumper being automatically displaceable in the vehicle longitudinal direction under impact action, the bumper comprising a rigid center member, yielding means for supporting said rigid center member at the form-rigid vehicle parts, a side member provided at respective ends of said rigid center member, each of said side members extending outwardly from the respective ends of the rigid center member and rearwardly thereof, and guide means provided in said rigid center member at least at the respective ends thereof, one end of each of said side members being disposed in a respective guide means, the other end of each of said side members being pivotally supported at the fixed vehicle part.

2. A bumper according to claim 1, wherein the form-rigid vehicle parts are vehicle longitudinal bearer means.

3. A bumper according to claim 1, wherein said yielding means are shock-absorbing means.

4. A bumper according to claim 1, wherein said yielding means are shock-damping means.

5. A bumper according to claim 1, wherein said rigid center member extends rectilinearly at least between its support places at the form-rigid vehicle parts and at an angle to the rectilinear portion at its ends in the direction of said side members.

6. A bumper according to claim 5, wherein said center member extends at an inclination on both sides thereof adjoining the rectilinear portion in the direction toward said side members.

7. A bumper according to claim 5, wherein said rigid center member extends adjoining the rectilinear portion thereof with a continuous curvature in the direction toward said side members.

8. A bumper for motor vehicles, especially passenger motor vehicles, which is automatically displaceable in the vehicle longitudinal direction upon impact, said bumper comprising: a center portion of relatively high rigidity supported at form-rigid vehicle parts by yielding means and two laterally extending means adjoining said center portion and guided thereby, said laterally extending means being pivotally supported at a fixed vehicle part, said center portion extending rectilinearly at least between its support places at the form-rigid vehicle parts and at an angle to the rectilinear part at its ends in the direction of said laterally extending means, said center portion having an approximately box-shaped structure including two box-shaped bearer means arranged vertically one above the other and connected with each other by bumper horns and a rear closure plate means.

9. A bumper according to claim 8, wherein intermediate space between the two box-shaped bearer means is filled by a forwardly projecting insert means made of elastic material.

10. A bumper according to claim 9, wherein both the bumper horns as also said two laterally extending means are provided with abutment means of elastic material.

11. A bumper according to claim 10, wherein said laterally extending means are guided by the back side of the elastic insert means when the center portion gives way, and emerge out of the center portion through an aperture provided in said rear closure plate means.

12. A bumper according to claim 11, wherein said laterally extending means are provided with bent-off ends which abut during normal driving operation at an edge of said aperture.

13. A bumper according to claim 12, wherein the fixed vehicle part, on which are pivotally supported said laterally extending means, is constituted by a girder extending approximately in the vehicle transverse direction and supported at vehicle longitudinal bearer means.

14. A bumper according to claim 13, wherein terminal members are provided adjoining said pivotally supported laterally extending means.

15. A bumper according to claim 14, wherein said terminal members are of similar construction to said laterally extending means.

16. A bumper according to claim 15, wherein said terminal members extend approximately to the cutouts of the wheel casings.

17. A bumper according to claim 15, wherein said terminal members are fixedly mounted.

18. A bumper according to claim 14, wherein said terminal members are fixedly mounted.

19. A bumper for motor vehicles, especially passenger motor vehicles, which is automatically displaceable in the vehicle longitudinal direction upon impact, said bumper comprising: a center portion of relatively high rigidity supported at form-rigid vehicle parts by yielding means and two laterally extending means adjoining said center portion and guided thereby, said laterally extending means being pivotally supported at a fixed vehicle part, said center portion having an approximately box-shaped structure which includes two box-shaped bearer means arranged vertically one above the other and connected with each other by bumper horns and a rear closure plate means.

20. A bumper according to claim 19, wherein the intermediate space between the two box-shaped bearer means is filled by a forwardly projecting insert means made of elastic material.

21. A bumper according to claim 19, wherein the bumper horns and said two laterally extending means are provided with abutment means of elastic material.

22. A bumper according to claim 20, wherein said laterally extending means are guided by the back side of the elastic insert means when the center portion gives way, and emerge out of the center portion through an aperture provided in said rear closure plate means.

23. A bumper according to claim 20, wherein said laterally extending means are provided with bent-off ends which abut during normal driving operation at an edge of said aperture.

24. A bumper according to claim 1, wherein the fixed vehicle part, on which said side members are pivotally supported, is constituted by a girder extending approximately in the vehicle transverse direction and supported at vehicle longitudinal bearer means.

25. A bumper for motor vehicles, especially for passenger motor vehicles, which is automatically displaceable in the vehicle longitudinal direction under impact action, characterized in that the bumper includes a center portion of relatively high rigidity which is supported at form-rigid vehicle parts by yielding means, and in that two laterally extending means adjoin the center portion and are guided by said center portion, said laterally extending means being pivotally supported at a fixed vehicle part, and in that terminal members are provided adjoining said laterally extending means.

26. A bumper according to claim 25, characterized in that the terminal members are of similar construction to said laterally extending means.

27. A bumper according to claim 25, characterized in that the terminal members extend approximately to the cutouts of the wheel casings.

28. A bumper according to claim 25, characterized in that the terminal members are fixedly mounted.

29. A bumper arrangement for motor vehicles, the arrangement comprising: a rigid central member, means for yieldably supporting said central member on the vehicle, movably mounted side members adjoining the respective ends of said central member, and guide means provided on said central member at least at the respective ends thereof for guiding the movement of said side members, said guide means including at least a pair of spaced box-shaped elements provided on said central member, and means for interconnecting said spaced box-shaped elements to define said guide means.

30. A bumper arrangement for motor vehicles, the arrangement comprising: a central portion of relatively high rigidity, means for yieldably supporting said central portion on the vehicle, movably mounted laterally extending means adjoining said central portion, and means provided on said central portion for guiding the movement of said laterally extending means upon the application of an impact force on the bumper, said central portion including at least a pair of spaced box-shaped elements and means provided for interconnecting said spaced box-shaped elements, said last-mentioned means including a plate disposed in the rear of said spaced elements.

31. A bumper according to claim 30, wherein said guiding means includes apertures provided in said plate for guiding the movement of said laterally extending means.

* * * * *